3,167,485
WATER INSOLUBLE MODIFIED ENZYMES
Efraim Katchalski, Neve Weizmann, Rehovoth, and Estelle (Atara) Bar-Eli, 13 Wilson St., Tel-Aviv, Israel
No Drawing. Filed May 23, 1961, Ser. No. 125,277
Claims priority, application Israel May 27, 1960
4 Claims. (Cl. 195—63)

It is an object of the present invention to provide novel compositions of matter, namely, modified enzymes, rendered water-insoluble by bonding said enzymes covalently to water-insoluble carriers and to modified enzymes rendered water-insoluble by bonding said enzymes covalently via polymeric chains to water insoluble, preferably polymeric, carriers, to methods for preparing said modified enzymes and to methods for effecting enzymatic processes by means of said novel modified enzymes.

Attempts have been made to adsorb enzymes or suitable carriers and to apply them in this form in enzymatic processes. Such attempts have not resulted hitherto in the enzymatic substances having the desired effect, as the adsorption was generally accompanied by a substantial, and in some cases even total inactivation of the thus bonded enzymes.

Furthermore, as the adsorption is a reversible process, any substrate hydrolyzed by means of such carrier-adsorbed enzymes was contaminated by the enzymes which had to be inactivated subsequently.

It has now been found that enzymatically active, repeatedly usable modified enzymes can be prepared by bonding same covalently via groups of the enzyme which are non-essential to their enzymatic activity either directly or through polymeric chains to water-insoluble carriers.

It is a further object of the present invention to provide novel compositions of matter, namely water-insoluble enzymatically active substances, comprising enzymes, functional groups of which that are not essential to their enzymatic activity are linked by covalent bonds to chain formed polymeric links, said latter being covalently bonded to preferably polymeric water-insoluble carriers.

It is yet another object of the invention to provide novel means for effecting enzymatic processes, namely columns containing such modified enzymatically active water-insoluble modified enzymes.

It is yet another object of the present invention to provide novel enzymatic methods, carried out by means of the novel enzymatically active water-insoluble modified enzymes.

Other objects of the invention will become apparent hereinafter.

It has been found that such novel water-insoluble modified enzymes can be used repeatedly for effecting enzymatic processes. It has been found that such processes can be carried out by introducing such water-insoluble modified enzymes into solutions of the substrate to be hydrolyzed, stirring said solution for a predetermined duration and filtering off.

It has further been found that such enzymatic processes can be effected by passing a solution of the substrate to be converted through columns of, or columns containing such water-insoluble substrate in admixture with suitable inert volume extenders, the rate and degree of conversion being a function of the parameters of the column and of the rate of flow through said column.

As described in greater detail in Example 1, it has been found that a water-insoluble carrier, namely a copolymer of L-leucine and p-amino-phenyl-DL-alanine can be prepared by reacting the corresponding N-carboxy-anhydrides and that same can be bonded covalently to papain so as to result in a water-insoluble modified enzyme which is enzymatically active. As shown in Example 2, the same polymeric carrier can be bonded covalently to polytyrosyl-trypsin, prepared by reacting N-carboxy-L-tyrosine anhydride and trypsin, by preparing the diazonium salt of the water insoluble carrier and by coupling same with the polytyrosil-trypsin.

The term "modified enzymes" denotes enzymatically active, water-insoluble substances according to the present invention, comprising enzyme molecules which are bonded covalently either directly to a water-insoluble carrier, or are bonded to such carrier through a chain-formed polymeric link.

In some cases, an enzyme such as papain, can be bonded directly to a water-insoluble carrier, without substantial loss of enzymatic activity. In other cases, as for example trypsin, chymotrypsin and urease, an intermediate link must be resorted to, as will be exemplified in the following.

It is clear that the method of preparing such modified water insoluble enzymes has to be adapted in each case to the available function groups which are not essential to the enzymatic activity, as can be seen from the following examples.

The invention is illustrated by the following examples, to which it is not limited.

EXAMPLE 1.—WATER INSOLUBLE PAPAIN

*(a) Preparation of the water-insoluble carrier (copolymer I)*

The water insoluble carrier was prepared by the copolymerisation of N-carboxy-L-leucine anhydride with p,N-carbobenzoxy amino-$\alpha$,N-carboxy-DL-phenylalanine anhydride and the removal of the carbobenzoxy groups from the copolymer thus obtained with anhydrous hydrogen bromide. It consists of a copolymer of L-leucine and p-aminophenyl-DL-alanine.

3.5 g. of p,N-carbobenzoxy amino-$\alpha$,N-carboxy-DL-phenylalanine anhydride, prepared according to M. Sela and E. Katchalski, J. Am. Chem. Soc., 76, 129 (1954), and 1.5 g. of N-carboxy-L-leucine anhydride, prepared according to A. C. Farthing, J. Chem. Soc. 3213 (1950), were dissolved in 100 ml. dioxane and 0.1 ml. of triethylamine was added. The reaction mixture was kept at room temperature with magnetic stirring for 72 hours. The solution was refluxed during 1 hour in an oil-bath and cooled down to 25° C. Precipitation of the copolymer was effected by addition of distilled water, yielding 3.5 g. of a yellowish substance. This substance was dried over phosphorus-pentoxide and the carbo-benzoxy groups were removed by addition of 30 ml. of a 33% HBr/acetic acid solution at room temperature, according to D. Ben-Ishai and Berger, J. Org. Chem., 17, 1564 (1952). Dissolution took place within 2 hours and precipitation was effected by the addition of anhydrous ether. The excess of HBr was removed by repeated washing with ether and centrifugation. The thus obtained substance was dried over sodium hydroxide. Yield 2.5 g.

The copolymer of p,N-carbobenzoxyamino-DL-phenylalanine and L-leucine was analysed for amino nitrogen content (Van Slyke). From the value obtained a number average molecular weight of 3400 was calculated. A chromatographic analysis of an acid hydrolysate (6 N hydrochloric acid) of the copolymer I, according to Block, E. Durrum and G. Zweig: Paper Chromatography, p. 113–d; Kay Harris: Arch. Biochem. Biophys., 63, 14 (1956), yielded p-aminophenyl-DL-alanine in a molar ratio of 1 to 2.5.

*(b) Coupling of papain with copolymer I*

The copolymer (250 mg.) was dissolved in 50% aqueous acetic acid (3 ml.) and the solution was mixed with 2 N HCl (3 ml.). Diazotization was effected by dropwise addition of 0.5 ml. sodium nitrate solution to the ice-cooled polymer solution. The polydiazonium salt was precipitated after two hours at 4° by adding 2 N NaOH to pH 8.0. It was washed twice with 12 ml. portions of 10% sodium acetate followed by 0.1 M sodium phosphate buffer, pH 7.6 (30 ml.). Coupling with papain was carried out by adding crystalline papain (Worthington, 2X crystallized, 80 mg.) suspended in 0.03 M cysteine (2.0 ml.) to a suspension of the diazotized copolymer in an aqueous solution (40 ml.) at pH 7.6, 0.075 M in phosphate, 0.005 M in cysteine and 0.002 M in ethylene diamine tetraacetate. Oxygen was removed by flushing the mixture with nitrogen and the coupling was allowed to proceed in a tightly stoppered vessel for 20 hours at 4°, with magnetic stirring. No free diazonium groups could be detected by means of $\alpha$-naphthol after this period. The water-insoluble coupling product was centrifuged down and washed several times with a solution at pH 6.0, 0.005 N in cysteine and 0.002 N in ethylene diamine tetraacetate. No enzymatic activity was detected in the initial supernatant or in any of the subsequent washings. The final water-insoluble papain (250 mg.) was stored at 4° under an aqueous solution similar in composition to the wash-solution. To facilitate pipetting of aliquots of constant enzymatic activity, the water-insoluble enzyme was homogenized in a Potter homogenizer with a Teflon piston. No loss in activity occurred during this procedure.

The content of protein in the water-insoluble papain was estimated by determining the amount of valine liberated on acid hydrolysis. A 10 mg. amount of insoluble enzyme yielded, after 48 hours of hydrolysis in 10 N HCl, 0.23 mg. valine as determined by quantitative paper chromatography. Since the valine residue content of papain is 7.13%, 100 mg. of the water-insoluble papain contain 28 mg. protein. The enzymatic activity of the insoluble papain was assayed by following the hydrolysis of benzoyl-L-arginine ethyl ester (BAEE) at pH 6.0 and 30°, in an autotitrator (Radiometer, Copenhagen, Model TTT1). The assay solution (5 ml.), having a pH of 6.0, was 0.025 M in BAEE, 0.002 M in ethylene diamine tetraacetate, and 0.005 M in systeine. The equivalent amount of active enzyme was calculated from the initial rate of alkali consumption by comparison with soluble papain. 100 $\mu$g. of which gave an initial rate of 1.6 $\mu$g. alkali per minute. By this assay 100 $\mu$g. of water-insoluble papain were found to equal in activity 20 $\mu$g. of crystalline enzyme. Taking into consideration the protein content of the insoluble enzyme an enzymatic activity of about 70% was calculated for the bound protein.

Storage of the water-insoluble papain at 4° for a period of one month, under the conditions described above, resulted in a 30% loss in activity. When the enzyme preparation was heated for 30 seconds in a boiling water bath, the activity towards benzoyl-L-arginine ethyl ester decreased to aproximately a fifth of its original value.

A study of the activity of water-insoluble papain towards benzoyl-L-arginine ethyl ester as a function of pH revealed a broad optimum in the region pH 6.0 to 7.5.

EXAMPLE 2.—WATER INSOLUBLE TRYPSIN (a) *Preparation of the water-insoluble carrier (copolymer 1)*

A copolymer of L-leucine and p-amino-DL-phenylalanine was prepared as described in Example 1(a), above.

(b) *Preparation of polytyrosyl-trypsin (PTT)*

155 mg. of trypsin, containing 50 percent by weight of magnesium sulphate, were dissolved in 12 ml. phosphate buffer of pH 7.2 and ionic strength 0.25. The solution was cooled to 0° C. and 130 mg. of N-carboxy-L-tyrosine anhydride, prepared according to A. Berger et al., Bull. Res. Council Israel, 7A, 98 (1958), dissolved in 3 ml. dioxane were added dropwise resulting in a slightly turbid solution. Magnetic stirring was effected at a temperature of 2° C. during 20 hours. The solution obtained was dialyzed during 5 days against 0.0025 N hydrochloric acid at a temperature of 2° C., with 5 changes of the dialysis fluid. The clear solution obtained was lyophilized, yielding 75 mg. polytyrosyltrypsin. The absence of free tyrosine in the enzymatic preparation obtained was proved chromatographically.

The quantity of tyrosine which reacted with trypsin to form the polytyrosyl-trypsin (PTT) preparation obtained was derived from the UV adsorption in 0.1 N sodium hydroxide at $\lambda=293.5$ m$\mu$, using the corresponding quantity of trypsin as a blank. The PTT was found to contain 8.5 percent by weight of tyrosine in the form of tyrosine peptide side-chains.

(c) *Coupling of polytyrosyl-trypsin (PTT) with copolymer 1*

200 mg. of copolymer I were dissolved in a mixture of 4 ml. water and 0.8 ml. 2 N hydrochloric acid and the mixture was cooled to $-2°$ C. 0.5 ml. of 0.5 M sodium nitrite was added within 1 hour with occasional stirring. The diazonium salt of the copolymer I was precipitated by adding 5ml. of 10% aqueous sodium acetate and raising the pH to pH=8 by adding 1 N NaOH. The precipitate was centrifuged and washed with 10% sodium acetate and with phosphate buffer of pH 7.3 ionic strength 0.25, yield of diazonium salt 160 mg. To the polymeric diazonium salt obtained were added 8 ml. phosphate buffer, pH 7.3, ionic strength 0.25 and a solution of 29 mg. polytyrosyltrypsin in 2 ml. of 0.0025 N hydrochloric acid. The resulting mixture was kept at 2° C. for one and a half hours, the pH was adjusted to 6.8 with 0.1 N HCl and the mixture left for an additional 18 hours with magnetic stirring at 2° C. The final water-insoluble complex obtained was washed with cold phosphate buffer of pH 7.3, ionic strength 0.25, 10% sodium acetate and 0.0025 N hydrochloric acid. A yield of 130 mg. of a water-insoluble polytyrosyl-trypsin copolymer (designated as I-PTT) was thus obtained.

The protein content (20% by weight) of the I-PTT synthesized was calculated from the amount of valine obtained on total acid hydrolysis. Quantitative chromatographic analysis of the acid hydrolysate yielded 1.15% of valine for I-PTT. Trypsin yielded under similar conditions 5.7% of valine.

(d) *Estimation of active enzyme in I-PTT*

The enzymatic activity of I-PTT towards benzoyl-L-arginine methyl ester (BAME) was determined titrimetrically using a pH-stat titrator model TTT–1, with an automatic recorder. The initial rate of hydrolysis of the 9 mg. of the ester BAME in 2.5 ml. phosphate buffer 0.01 M at pH 7.8 by 1.7 mg. of I-PTT, corresponded to that of 0.083 mg. of crystalline trypsin. It may thus be concluded that the tryptic activity of 1000 mg. I-PTT towards BAME corresponds to that of 50 mg. crystalline trypsin.

(e) *Preparation of a trypsin column*

The water-insoluble I-PTT (6 mg.) was mixed with 500 mg. Geon (inert vinylic resin 426 Goodrich) and the mixture introduced into a glass tube of 6 mm. internal diameter and 100 mm. height.

(f) *Illustration of the possible use of the trypsin column*

(i) *Digestion of L-arginine methyl ester.*—The rate of hydrolysis of L-arginine methyl ester by the column when the ester was passed at different rates was determined as follows. A solution containing 3.5 mg. of L-arginine methyl ester per ml. 0.1 M phthalate buffer pH 6.2, ionic strength 0.19, was prepared. The solution was passed through the column at different rates by changing hydrostatic pressure and the amount of intact ester determined by Hestrin's procedure, S. Hestrin, J. Biol. Chem., 180, 249 (1949). The extent of hydrolysis is inversely proportional to the rate of flow through the column, as evident from Table 1.

TABLE 1

| Rate of flow: | Hydrolysis of ester (in percent) |
|---|---|
| 1 cc./2 min. | 20 |
| 1 cc./5 min. | 50 |
| 1 cc./8 min. | 80 |
| 1 cc./10 min. | 100 |

Experiments have shown that such columns can be used repeatedly without a perceptible decrease of the enzymatic activity.

(ii) *Digestion of poly-L-lysine and of protamine.*—Enzymatic hydrolysis of poly-L-lysine could also be effected by the column. Thus when a solution of poly-L-lysine hydrobromide (10 mg. per ml. 0.05 M phosphate buffer, pH 7.6) was passed through the trypsin column at the rates given in Table 2, the following products could be determined chromatographically in the effluent: lysine, dilysine, trilysine, and tetralysine, according to the procedure described by S. G. Waley and J. Watson, Biochem. J., 55, 328 (1953). The amounts of these digestion products as a function of the rate of flow are presented in Table 2.

TABLE 2

| Rate of flow | Lysine, mg./cc. | Dilysine, mg./cc. | Trilysine, mg./cc. | Tetralysine, mg./cc. |
|---|---|---|---|---|
| 1 cc./26 min | 0.09 | 1.94 | 3.22 | 2.0 |
| 1 cc./60 min | 0.164 | 2.21 | 3.50 | 1.53 |
| 1 cc./120 min | 0.38 | 3.15 | 3.15 | 0.425 |

Protamine sulfate could also be hydrolyzed by passing through the trypsin column. The digestion products determined chromatographically were found to be identical with those formed on incubation with native trypsin.

(g) *Partial digestion of myosin by I-PTT*

A solution of myosin as described by V. Kessler and S. Spicer, Biophys. Biochem. Acta, 8, 474 (1952), 0.68% myosin in a 0.03 M phosphate buffer of pH 7, and 0.6 M in respect to KCl, was stirred at room temperature with I-PTT (1 mg.) for 3 hours. The insoluble enzyme was centrifuged off and the supernatant analyzed in the ultracentrifuge at 56,100 r.p.m. Two new peaks appeared corresponding to those of light and heavy meromyosin, A. Holtzer and S. Lowey, Biochem. Biophys. Acta, 34, 470 (1959).

EXAMPLE 3.—WATER INSOLUBLE CHYMOTRYPSIN (a) *Preparation of polyalanyl-chymotrypsin (PAlC)*

A solution of 90 mg. chymotrypsin dissolved in 6 ml. 0.05 M phosphate buffer, pH=7.2, ionic strength, $\mu$=0.25, was cooled to 0° C., and 100 mg. of N-carboxy-DL-alanine anhydride were added. Magnetic stirring was effected at a temperature of 2° C. during 20 hours. The clear solution was dialysed for 5 days at 2° C. against distilled water, and finally lyophilized to yield 83 mg. of the required polyalanylchymotrypsin (PAlC).

The quantity of alanine combined with the chymotrypsin to form the polyalanyl-chymotrypsin preparation described was deduced from an electrophoretic and chromatographic analysis—according to R. Block, E. Durrum and G. Zweig: Paper Chromatography, p. 575, p. 113 of an acid hydrolyzate of PAlC. The PAlC was found to contain 20 percent by weight of alanine in the form of alanine peptide side chains.

(b) *Preparation of polytryosyl-polyalanyl-chymotrypsin (PTAlC)*

60 mg. polyalanyl-chymotrypsin were dissolved in 8 cc. 0.05 M phosphate buffer pH 7.2. The solution was cooled to 0° C. and 55 mg. of N-carboxy-DL-tyrosine anhydride (A. Berger et al., Bull. Res. Council Israel, 7A, 98 (1958)) dissolved in 1 cc. dioxane were added dropwise. The resulting slightly turbid solution was stirred magnetically for 20 hours at 2° C. The final solution obtained was dialyzed against 0.0025 N hydrochloric acid for 5 days at 2° C. and lyophilized to yield 50 mg. of polytyrosyl-polyalanyl-chymotrypsin (PTAlC).

The amount of tyrosine combined with PAlC to form the PTAlC preparation described was deduced from UV adsorption in 0.1 N NaOH at $\lambda$=293.5 m$\mu$. A corresponding quantity of polyalanyl-chymotrypsin (PAlC) was used as a blank. The PTAlC was found to contain 8 percent by weight of tyrosine in the form of tyrosine peptide side chains.

(c) *Coupling of polytyrosyl-alanyl-chymotrypsin (PTAlC) with copolymer I*

The coupling of 23 mg. PTAlC with 100 mg. of the diazotized copolymer of p-aminophenylalanine and leucine (I) was carried out analogously to the coupling of PTT with (I) as described in paragraph (c), Example 2. Yield of water insoluble chymotrypsin derivative (I-PTAlC), 75 mg.

The protein content (23% by weight) of the I-PTAlC synthesized was derived from the amount of valine obtained on acid hydrolysis. Quantitative chromatographic analysis of the acid hydrolysate gave 1.3% of valine for I-PTAlC. Chymotrypsin yielded under similar conditions 5.6% of valine.

(d) *Estimation of active enzyme in I-PTAlC*

The enzymatic activity of I-PTAlC towards L-tyrosine ethyl-ester (TEE) was determined titrimetrically. The initial rate of hydrolysis of the ester (8.5 mg. in 3 ml. 0.03 M KCl pH=6.0) by 4 mg. of I-PTAlC corresponded to that of 0.130 mg. of crystalline chymotrypsin. It was thus concluded that the chymotryptic activity of 1000 mg. I-PTAlC towards TEE corresponds to that of 33 mg. crystalline chymotrypsin.

EXAMPLE 4—WATER INSOLUBLE UREASE

It is possible to prepare modified, water insoluble urease by bonding this enzyme covalently via its sulphhydryl groups non-essential to its enzymatic activity by means of modified polyethylene glycol to cellulose.

Polyethylene glycol of a molecular weight of about 200 is subjected to esterification of one of the terminal hydroxyl groups by means of iodoacetic acid, resulting in iodoacetic acid polyethylene glycol monoester. The second terminal hydroxyl group is converted into a chloroformate substituent by reacting it with phosgene, and this reactive chloroformate group is reacted with hydroxyl group of cellulose resulting in its bonding thereto with the splitting off of HCl. The terminal iodoacetic radical is reacted with the sulphhydryl grouping of the enzyme, and subsequently the polyethylene ester chain is bonded thereto with a simultaneous evolution of hydrogen iodide.

An amount of 4 g. polyethylene glycol, M.W. 200, was subjected to esterification by heating with 3 g. iodoacetic acid ($ICH_2COOH$) for 2 hours at 200° C. Yield of liquid iodoacetic acid polyethylene glycol monoester was 6 g. Liquid phosgene (1.5 ml.) was added dropwise to the ice cooled monoester and the reaction mixture stirred for one hour. Excess of phosgene was removed with nitrogen. One gram of the chloroformate of the monoester was then added to 25 g. of cellulose powder in a 10 percent solution of sodium bicarbonate, and the mixture stirred for 3 hours at 0° C. The water-insoluble product was washed with water and dried in vacuo. The final product contained 0.5 percent organic iodine. The cellulose derivative obtained (200 mg.) was suspended in 6 ml. of 0.1 M phosphate buffer, pH 7.6, and a solution of 30 mg. of urease in 4 ml. of the same buffer was added. Stirring was effected at 2° C. for 20 hours.

The insoluble modified urease formed was separated by centrifugation and washed three times with 0.1 M phosphate buffer, pH 7.6. The water-insoluble preparation showed urease activity equal to about 3 percent by weight respective an equal weight of crystalline urease.

The percentage of bound urease was determined after total hydrolysis and determination of one of the characteristic amino acids, such as leucine. 18 percent of bound protein was determined in the dry substance.

The enzymatic activity of the water-insoluble modified enzyme was derived from the amount of ammonia liberated on incubation with urea.

Although we have described our invention with a certain degree of particularity, it is understood that the present disclosure has been made only by way of example and that numerous changes both as to the enzymes, chain-formed links, insoluble carrier as well as to the manner of effecting the bonding may be resorted to without departing from the scope and spirit of the invention.

What we claim is:

1. An enzymatically active, water-insoluble substance, comprising papain bonded covalently to a water-insoluble copolymer of L-leucine and p-amino phenyl-DL-alanine.
2. An enzymatically active, water-insoluble substance, comprising trypsin bonded by covalent bonds via chain-formed polytyrosyl links to a water-insoluble carrier, said carrier being a copolymer of L-leucine and p-amino-phenyl-DL-alanine.
3. An enzymatically active, water-insoluble substance, comprising chymotrypsin bonded by covalent bonds via chain-formed polyalanyl-polytyrosyl links to a water-insoluble carrier, said carrier being a copolymer of L-leucine and p-amino-phenyl-DL-alanine.
4. An enzymatically active, water-insoluble substance which comprises urease bonded covalently through modified polyethylene glycol chains to cellulose.

References Cited in the file of this patent

Bar-Eli et al.: "Nature," 188, 856–857, December 3, 1960.

Journal American Chemical Society, 1956, vol. 78, pp. 746–751 (Sela et al.), (764–767) Tsuyuki et al.

Katchalski et al.: Articles in Methods in Enzymology, 1955, vol. III, pp. 540–554.